United States Patent
Funada (10) Patent No.: US 8,319,894 B2
(45) Date of Patent: Nov. 27, 2012

(54) DISPLAY APPARATUS CAPABLE OF DISCRIMINATING THE TYPE OF INPUT SIGNAL FROM DIFFERENT SIGNALS

(75) Inventor: Masahiro Funada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1333 days.

(21) Appl. No.: 11/671,854

(22) Filed: Feb. 6, 2007

(65) Prior Publication Data

US 2007/0182443 A1 Aug. 9, 2007

(30) Foreign Application Priority Data

Feb. 9, 2006 (JP) ................................. 2006-032689

(51) Int. Cl.
*H04N 3/27* (2006.01)
*H04N 5/268* (2006.01)

(52) U.S. Cl. ........................................................ 348/554

(58) Field of Classification Search .......... 348/552–556, 348/558, 705, 706, 525, 725; 345/699, 213
See application file for complete search history.

(56) References Cited

U.S. PATENT DOCUMENTS

| | | | | | |
|---|---|---|---|---|---|
| 4,991,120 | A * | 2/1991 | Vaiana | ........................... | 345/602 |
| 5,038,282 | A * | 8/1991 | Gilbert et al. | .................... | 712/14 |
| 5,121,498 | A * | 6/1992 | Gilbert et al. | ................. | 717/149 |
| 5,926,174 | A * | 7/1999 | Shibamiya et al. | ............ | 345/213 |
| 6,310,659 | B1 * | 10/2001 | Glen | ............................... | 348/589 |
| 6,333,750 | B1 * | 12/2001 | Odryna et al. | ................. | 345/629 |
| 6,348,931 | B1 * | 2/2002 | Suga et al. | ..................... | 345/699 |
| 6,476,801 | B2 * | 11/2002 | Nagai | ............................. | 345/213 |
| 6,587,153 | B1 * | 7/2003 | Unemura | ........................ | 348/468 |
| 6,704,009 | B2 * | 3/2004 | Tachibana et al. | ............. | 345/213 |
| 6,744,917 | B1 * | 6/2004 | Sadowski et al. | ............. | 382/162 |
| 7,015,973 | B2 * | 3/2006 | Kim | ............................. | 348/536 |
| 7,065,190 | B2 * | 6/2006 | Gershfeld | ................... | 379/93.01 |
| 7,119,847 | B2 * | 10/2006 | Meiners | ......................... | 348/558 |
| 7,139,032 | B2 * | 11/2006 | Unemura | ....................... | 348/555 |
| 7,236,209 | B2 * | 6/2007 | Martin | ........................... | 348/554 |
| 7,432,980 | B2 * | 10/2008 | Chu et al. | ...................... | 348/536 |
| 7,701,512 | B1 * | 4/2010 | Woodall et al. | ................ | 348/526 |
| 7,719,529 | B2 * | 5/2010 | Anderson et al. | ............. | 345/213 |
| 8,019,194 | B2 * | 9/2011 | Morrison et al. | .............. | 386/239 |

FOREIGN PATENT DOCUMENTS

| | | |
|---|---|---|
| JP | 9-200660 A | 7/1997 |
| JP | 2001-324952 A | 11/2001 |
| JP | 2003-044030 A | 2/2003 |

* cited by examiner

*Primary Examiner* — Paulos Natnael
(74) *Attorney, Agent, or Firm* — Canon USA Inc IP Division (57) ABSTRACT

A display apparatus, equipped with a common input terminal inputting different video signals, can discriminate the type of an input video signal entered from the common input terminal. The display apparatus includes an input terminal inputting different video signals. A synchronizing signal separation unit separates a synchronizing signal from a video signal entered from the input terminal. A frequency measurement unit measures a frequency of the synchronizing signal. An input signal discrimination unit discriminates the video signal entered from the input terminal based on a type of the synchronizing signal separated by the synchronizing signal separation unit and a measurement result obtained by the frequency measurement unit.

8 Claims, 9 Drawing Sheets

| SIGNAL NAME | VGA01 | SVGA01 | XGA01 | SXGA01 | 480i | 480p | 720p | 1080i |
|---|---|---|---|---|---|---|---|---|
| HORIZONTAL FREQUENCY [kHz] | 31.47 | 37.38 | 48.36 | 63.98 | 15.73 | 31.47 | 44.96 | 33.72 |
| VERTICAL FREQUENCY [Hz] | 59.94 | 60.32 | 60.00 | 60.02 | 59.94 | 59.94 | 59.94 | 59.94 |
| SAMPLING CLOCK [MHz] | 25.18 | 40.00 | 65.00 | 108.00 | 13.50 | 27.00 | 74.18 | 74.18 |
| HORIZONTAL RESOLUTION [dot] | 640 | 800 | 1024 | 1280 | 720 | 720 | 1280 | 1920 |
| VERTICAL RESOLUTION [line] | 480 | 600 | 768 | 1024 | 480 | 480 | 720 | 1080 |
| HORIZONTAL DISPLAY START POSITION [dot] | 136 | 216 | 296 | 360 | 122 | 122 | 300 | 236 |
| VERTICAL DISPLAY START POSITION [line] | 27 | 27 | 35 | 41 | 38 | 38 | 25 | 40 |
| COMPONENT VIDEO SIGNAL FLAG | 0 | 0 | 0 | 0 | 1 | 1 | 1 | 1 |

DISPLAY APPARATUS CAPABLE OF DISCRIMINATING THE TYPE OF INPUT SIGNAL FROM DIFFERENT SIGNALS

BACKGROUND OF THE INVENTION

1. Field of the Invention

The present invention relates to a display apparatus. The display apparatus according to the present invention is, for example, applicable to a projection display apparatus (e.g., a liquid crystal projector or a digital light processing (DLP) projector) or to a liquid crystal display apparatus or the like.

2. Description of the Related Art

A display apparatus, such as a projection display apparatus, can input a digital RGB signal and an analog RGB signal from a computer, a component video signal from an audio visual (AV) device, as well as an S video signal and a composite video signal. The display apparatus is generally equipped with a plurality of input terminals for individually inputting respective signals.

However, for the purpose of reducing a space for the terminals, a common input terminal can be used to input different signals (e.g., an analog RGB signal and a component video signal).

Figure 9:
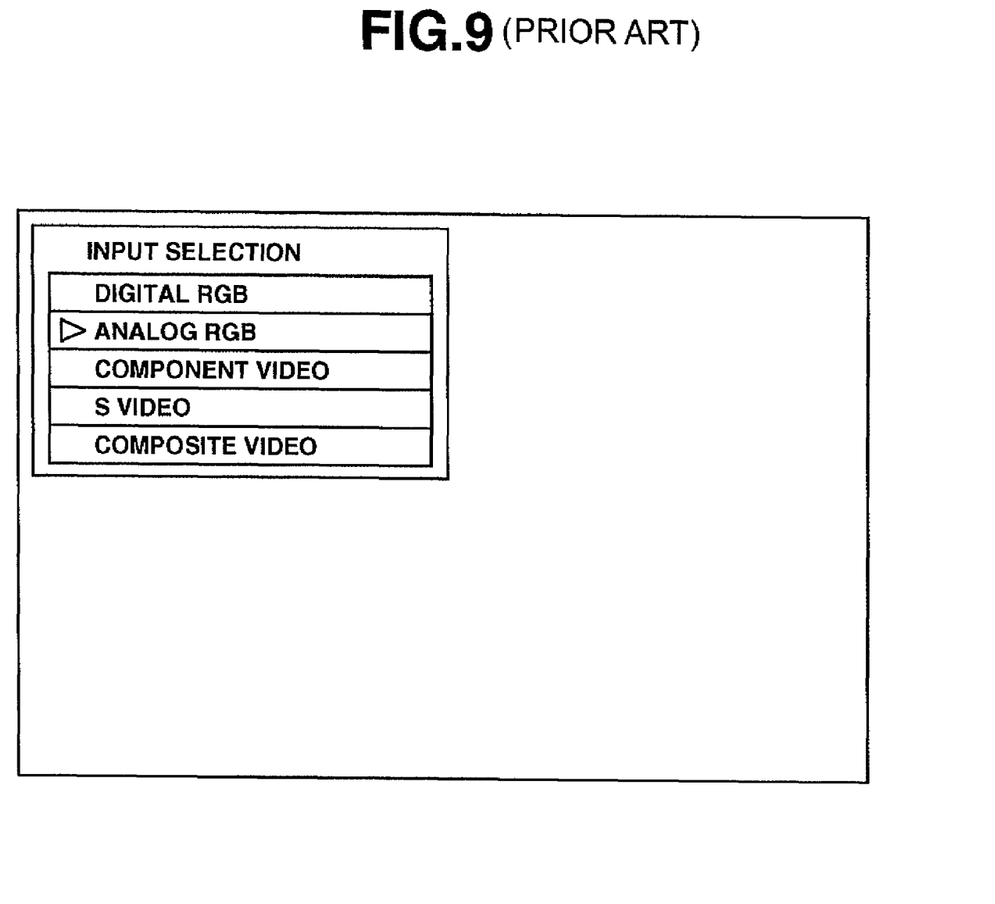
FIG. 9 illustrates a conventional input selection menu.

FIG. 9 illustrates a conventional on screen display (OSD) input selection menu that enables a user to select the type of input signal. According to a display example of FIG. 9, an analog RGB input is focused (selected).

A color space for processing the input signal is determined depending on user's selection of input on the OSD input selection menu, not depending on an input signal itself. Accordingly, when an input terminal is commonly used for different signals (e.g., an analog RGB signal and a component video signal), a displayed image has different tint if a user erred in selecting the type of input signal. A user may think the display apparatus is malfunctioning.

A display apparatus having an auto search function can successively change selection of input until a desirable input signal is selected. In a display apparatus having an auto search function, if a common input terminal is used to input different signals, an input signal may be erroneously detected depending on the order of auto search. For example, if the auto search is executed from top to bottom according to the menu shown in FIG. 9, the analog RGB input always precedes the component video input and accordingly an input component video signal may be erroneously detected as an analog RGB signal.

SUMMARY OF THE INVENTION

Exemplary embodiments of the present invention are directed to a display apparatus that can accurately discriminate an input signal when a common input terminal is used to input different video signals.

According to an aspect of the present invention, a display apparatus includes: an input terminal configured to input different video signals; a synchronizing signal separation unit configured to separate a synchronizing signal from a video signal entered from the input terminal; a frequency measurement unit configured to measure a frequency of the synchronizing signal; an input signal discrimination unit configured to discriminate the video signal entered from the input terminal based on a type of the synchronizing signal separated by the synchronizing signal separation unit and a measurement result obtained by the frequency measurement unit.

According to another aspect of the present invention, a method is provided which may be performed in a display apparatus for discriminating an input signal when a common input terminal is used to input different video signals, wherein the display apparatus includes an input terminal configured to input different video signals; a synchronizing signal separation unit configured to separate a synchronizing signal from a video signal entered from the input terminal; a frequency measurement unit configured to measure a frequency of the synchronizing signal; and an input signal discrimination unit configured to discriminate the video signal entered from the input terminal based on a type of the synchronizing signal separated by the synchronizing signal separation unit and a measurement result obtained by the frequency measurement unit. The method includes receiving different video signals from the input terminal; separating the synchronizing signal from the video signal; measuring the frequency of the synchronizing signal; and discriminating the video signal on the type of synchronizing signal and the frequency measurement result.

According to yet another aspect of the present invention, a computer readable medium is provided containing computer-executable instructions performed in a display apparatus for discriminating an input signal when a common input terminal is used to input different video signals, wherein the display apparatus includes an input terminal configured to input different video signals; a synchronizing signal separation unit configured to separate a synchronizing signal from a video signal entered from the input terminal; a frequency measurement unit configured to measure a frequency of the synchronizing signal; and an input signal discrimination unit configured to discriminate the video signal entered from the input terminal based on a type of the synchronizing signal separated by the synchronizing signal separation unit and a measurement result obtained by the frequency measurement unit. The computer readable medium includes computer-executable instructions for receiving different video signals from the input terminal; computer-executable instructions for separating the synchronizing signal from the video signal; computer-executable instructions for measuring the frequency of the synchronizing signal; and computer-executable instructions for discriminating the video signal based on the type of synchronizing signal and the frequency measurement result.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

The following description of exemplary embodiments is merely illustrative in nature and is in no way intended to limit the invention, its application, or uses.

It is noted that throughout the specification, similar reference numerals and letters refer to similar items in the following figures, and thus once an item is defined in one figure, it may not be discussed for following figures.

Exemplary embodiments will be described in detail below with reference to the drawings.

First Exemplary Embodiment

Figure 1:
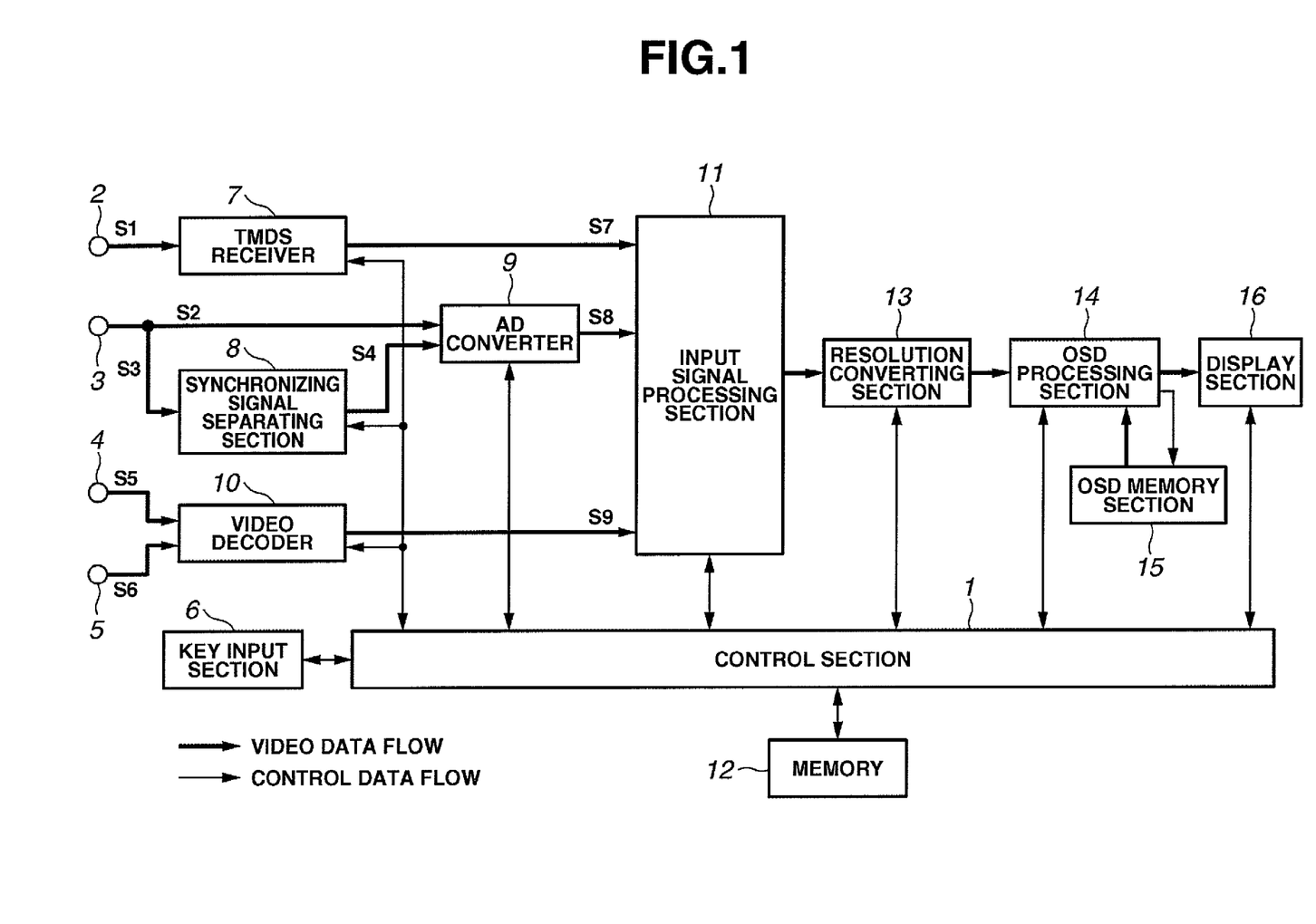
FIG. 1 is a block diagram illustrating am example projection display apparatus according to a first exemplary embodiment.

FIG. 1 is a block diagram illustrating a projection display apparatus according to a first exemplary embodiment. A control section 1 can execute various programs stored in a memory 12 to control functional sections of the display apparatus shown in FIG. 1. The display apparatus is equipped with a digital visual interface (DVI) terminal 2, a D-Sub 15-pin terminal 3, an S video terminal 4, a composite video terminal 5, and a key input section 6. The DVI terminal 2 is an input terminal capable of inputting a digital RGB signal from a computer. A transition minimized differential signaling (TMDS) receiver 7 can convert a TMDS signal entered from the DVI terminal 2 into a digital RGB signal.

The D-Sub 15-pin terminal 3 is a common input terminal capable of inputting an analog RGB signal from a computer and a component video signal from an audio visual (AV) device. A synchronizing signal separating section 8 separates horizontal and vertical synchronizing signals from a signal entered from the D-Sub 15-pin terminal 3 and supplies the separated horizontal and vertical synchronizing signals to an analog-to-digital (AD) converter 9. The AD converter 9 converts an analog input signal into a digital input signal based on a sampling frequency, an offset, and a gain set by the control section 1, and outputs a digital RGB signal or a digital YUV signal.

The S video terminal 4 is an input terminal capable of inputting an S video signal. The composite video terminal 5 is an input terminal capable of inputting a composite video signal. A video decoder 10 can convert an S video signal or a composite video signal entered from the S video terminal 4 or the composite video terminal 5 into a digital YUV signal and horizontal and vertical synchronizing signals, and output the converted signals.

An input signal processing section 11 measures the frequency of a synchronizing signal entered via a route selected by the control section 1 and outputs a measured frequency to the control section 1. The control section 1 can set horizontal and vertical capturing start positions and the resolution. A frame buffer (not shown) stores the setting values. If necessary, the input signal processing section 11 executes a conversion from a YUV color space to a RGB color space.

A resolution converting section 13 reads, from the frame buffer, pixel data of a region corresponding to output resolution data set by the control section 1. The resolution converting section 13 executes digital zoom processing, trapezoidal correction processing, and aspect ratio conversion processing on the read pixel data.

An on screen display (OSD) processing section 14 reads an image from an on screen display (OSD) image memory section 15 and superimposes the read image on a video signal entered from the resolution converting section 13 at a region designated by the control section 1. The OSD image memory section 15 is a nonvolatile memory that can store a menu and other images. A display section 16 can project, on a screen, an output video of the OSD processing section 14.

The projection display apparatus of the first exemplary embodiment includes an input selecting section that can input: a digital RGB signal from the DVI terminal 2; an analog RGB signal or a component video signal from the D-Sub 15-pin terminal 3; an S video signal from the S video terminal 4; and a composite video signal from the composite video terminal 5.

Figure 2:
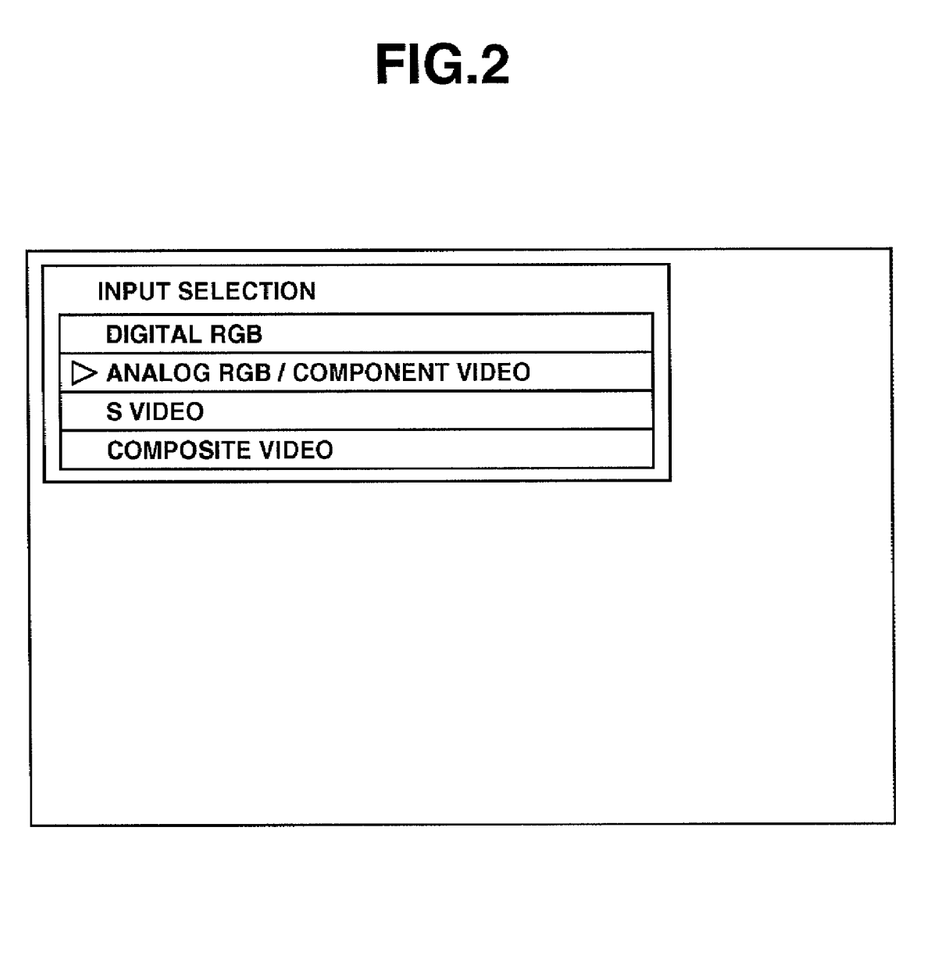
FIG. 2 illustrates an example input selection menu according to the first exemplary embodiment.

FIG. 2 illustrates an exemplary OSD input selection menu that enables a user to select the type of input signal. Although not shown in FIG. 1, a user can open the input selection menu with an input key, then select a desired input signal type with an up-and-down button, and determine (finalize) the selection with an OK button. The input selection menu is closed when the OK button is pressed. According to a display example shown in FIG. 2, an analog RGB/component video input is focused (selected).

The projection display apparatus according to the present embodiment processes each input signal and stores the processed signal into a frame buffer in the following manner. First, the TMDS receiver 7 inputs a TMDS signal S1 (i.e., digital RGB input) from the DVI terminal 2 and converts the TMDS signal S1 into a digital RGB signal, a horizontal synchronizing signal, and a vertical synchronizing signal and sends the converted signal S7 to the input signal processing section 11. The input signal processing section 11 measures frequencies of the input horizontal and vertical synchronizing signals and sends the measured frequencies to the control section 1.

The control section 1 retrieves signal timing closest to the measured horizontal and vertical frequencies with reference to a signal timing table (refer to FIG. 3) registered in the memory 12. The control section 1 sets registered horizontal and vertical capturing positions and resolution to the input signal processing section 11 according to the retrieved timing table. The input signal processing section 11 executes capturing of signal based on the set values, and a frame buffer stores the capturing result.

The video decoder 10 inputs a YC signal S5 (i.e., S video input) from the S video terminal 4. The video decoder 10 discriminates a signal type, such as NTSC, PAL, or SECAM, based on frequencies of a synchronizing signal included in a Y signal and a burst signal included in a C signal, and selects a demodulation method suitable for the discriminated signal type.

The video decoder 10 executes demodulation and sampling according to the selected demodulation method, and sends an output signal (YUV digital, horizontal synchronizing, and vertical synchronizing signal) S9 to the input signal processing section 11.

The input signal processing section 11 measures frequencies of the input horizontal and vertical synchronizing signals and sends the measured frequencies to the control section 1. The control section 1 retrieves signal timing closest to the measured horizontal and vertical frequencies with reference to the signal timing table (refer to FIG. 3) registered in the memory 12.

The control section 1 sets registered horizontal and vertical capturing positions and resolution to the input signal processing section 11 according to the retrieved timing table. Furthermore, the control section 1 makes effective a function for converting from a YUV color space to a RGB color space when the input signal is a YUV signal.

The video decoder 10 inputs a composite signal S6 (i.e., composite video input) from the composite video terminal 5. The processing applied to the composite signal S6 is similar to the aforementioned processing applied to the YC signal S5 (i.e., S video input) and is therefore not discussed below.

An analog RGB/component video signal is entered from the D-Sub 15-pin terminal 3. The AD converter 9 inputs a RGB signal S2. The synchronizing signal separating section 8 (i.e., synchronizing signal separation unit) inputs a signal S3 including a G signal, a horizontal synchronizing signal, and a vertical synchronizing signal. The synchronizing signal separating section 8 directly outputs the signal S3 if both the horizontal and vertical synchronizing signals are present.

The synchronizing signal separating section 8 executes synchronizing signal separation if no vertical synchronizing signal is present and a composite synchronizing signal is present in the horizontal synchronizing signal line, or if no synchronizing signals are present in the horizontal and vertical synchronizing signal lines and the G signal includes a sync on green signal. The synchronizing signal separating section 8 sends a separated synchronizing signal S4 (including horizontal and vertical synchronizing signals) to the AD converter 9. Furthermore, the synchronizing signal separating section 8 sends a synchronizing signal type to the control section 1 (i.e., input signal discrimination unit).

The AD converter 9 changes the clamp level of respective RGB signals to 0 levels and operates with default setting values (including a sampling frequency), and sends an output signal S8 (i.e., digital RGB signal, horizontal synchronizing signal, and vertical synchronizing signal) to the input signal processing section 11. The input signal processing section 11 (i.e., frequency measurement unit) measures frequencies of the input horizontal and vertical synchronizing signals and sends the measured frequencies to the control section 1.

The control section 1 retrieves signal timing closest to the measured horizontal and vertical frequencies with reference to the signal timing table (refer to FIG. 3) registered in the memory 12. Moreover, with reference to the retrieved timing table, the control section 1 sets registered sampling frequency and phase locked loop (PLL) setting values in the AD converter 9 and sets horizontal and vertical capturing positions and resolution in the input signal processing section 11.

Figure 3:
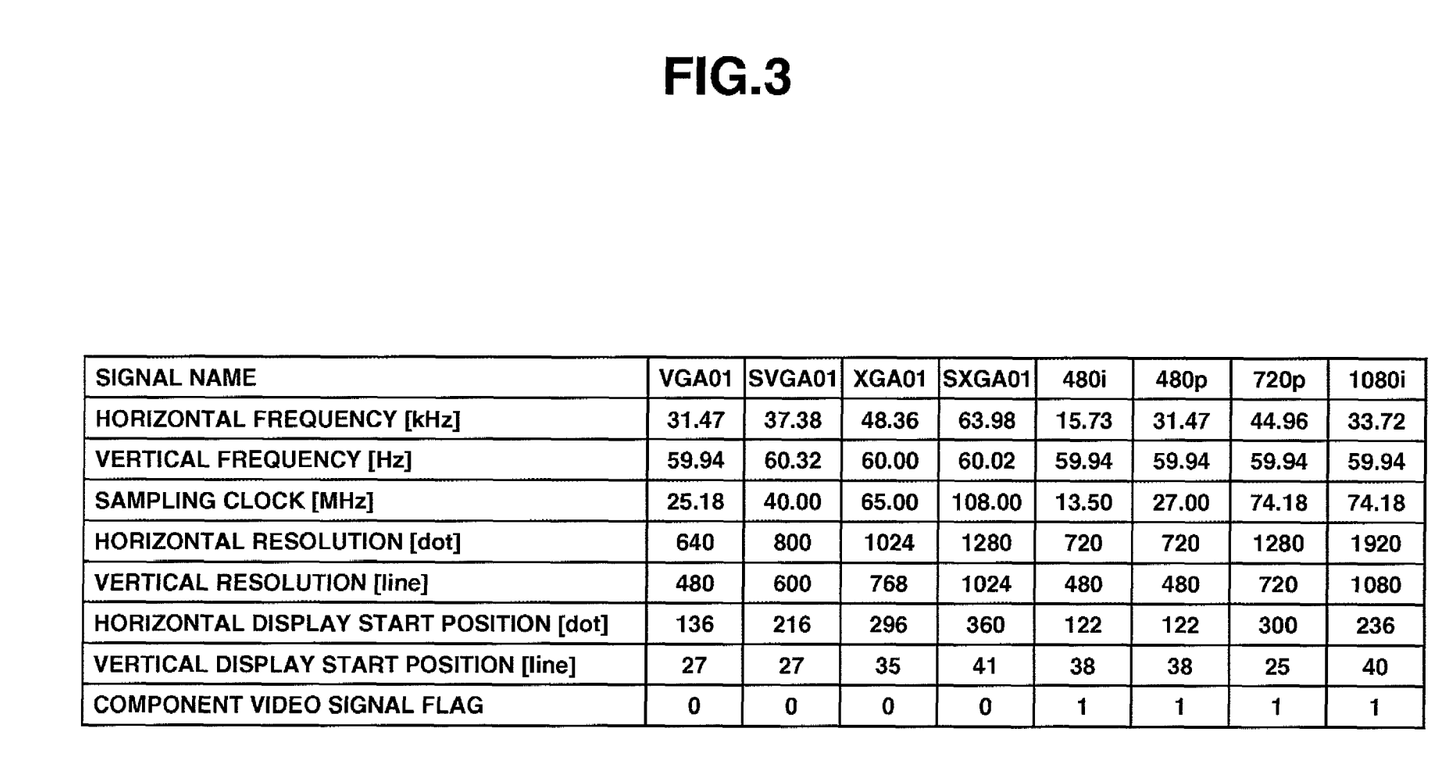
FIG. 3 illustrates an example signal timing table according to the first exemplary embodiment.

As understood from the table shown in FIG. 3, a VGA01 signal of an analog RGB input and a 480p signal of a component video input have the same horizontal and vertical frequencies. Accordingly, the VGA01 signal and the 480p signal entered from the same terminal cannot be discriminated from each other. Therefore, the conventional input selection menu shown in FIG. 9 separately displays an analog RGB input and a component video input. The conventional display apparatus realizes a display using a color space corresponding to the selected input type. If the user's input selection is incorrect, a displayed image has different tint.

The first exemplary embodiment can discriminate the VGA01 signal and the 480p signal from each other based on not only the frequency but also the type of synchronizing signals.

[Exemplary Procedure for Determining an Input Signal]

An exemplary procedure for determining an input signal is described with reference to flowcharts shown in FIGS. 4 and 5.

Figure 4:
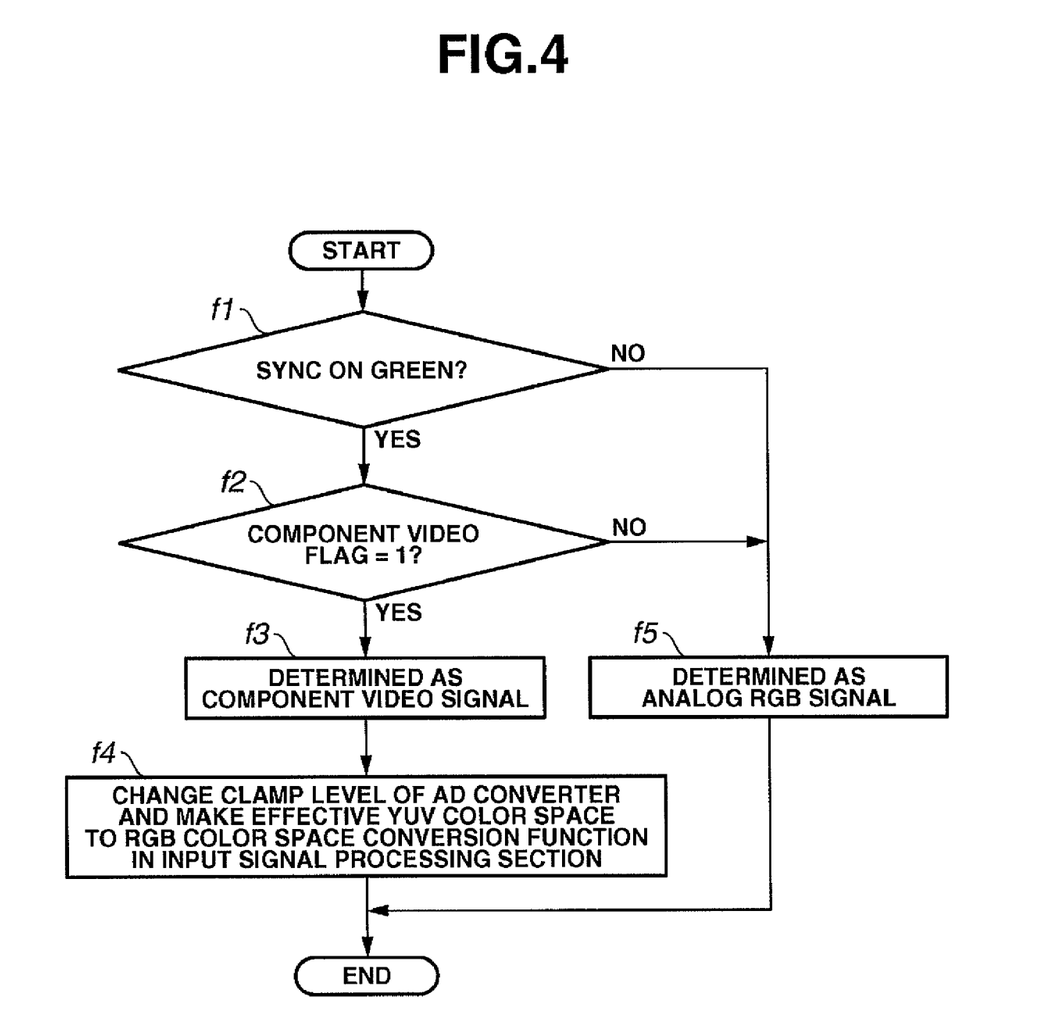
FIG. 4 is a flowchart illustrating an example input signal discrimination method according to the first exemplary embodiment.

First, the flowchart of FIG. 4 is described. In step f1, the control section 1 (i.e., input signal discrimination unit) determines whether the type of a synchronizing signal separated by the synchronizing signal separating section 8 (i.e., synchronizing signal separation unit) is sync on green.

If the synchronizing signal type is sync on green (YES in step f1), the processing flow proceeds to step f2. In step f2, the control section 1 further determines whether a component video flag of the retrieved signal timing is 1. If the component video flag is 1 (YES in step f2), the processing flow proceeds to step f3. In step f3, the control section 1 determines that the input signal is a component video signal.

Then, in step f4, the control section 1 causes the AD converter 9 to change the clamp level to a middle level for R and B signals and causes the input signal processing section 11 to make effective a function for converting from a YUV color space to a RGB color space. The input signal processing section 11 executes capturing of signal based on the set values, and a frame buffer stores the capturing result. Then the process ends.

In other cases (NO in step f1, or NO in step f2), the processing flow proceeds to step f5. In step f5, the control section 1 determines that the input signal is an analog RGB signal. Then the process ends.

As described above, the VGA01 signal and the 480p signal are identical in both horizontal and vertical frequencies. Thus, the control section 1 executes processing for determining whether an input signal is VGA01 or 480p.

Figure 5:
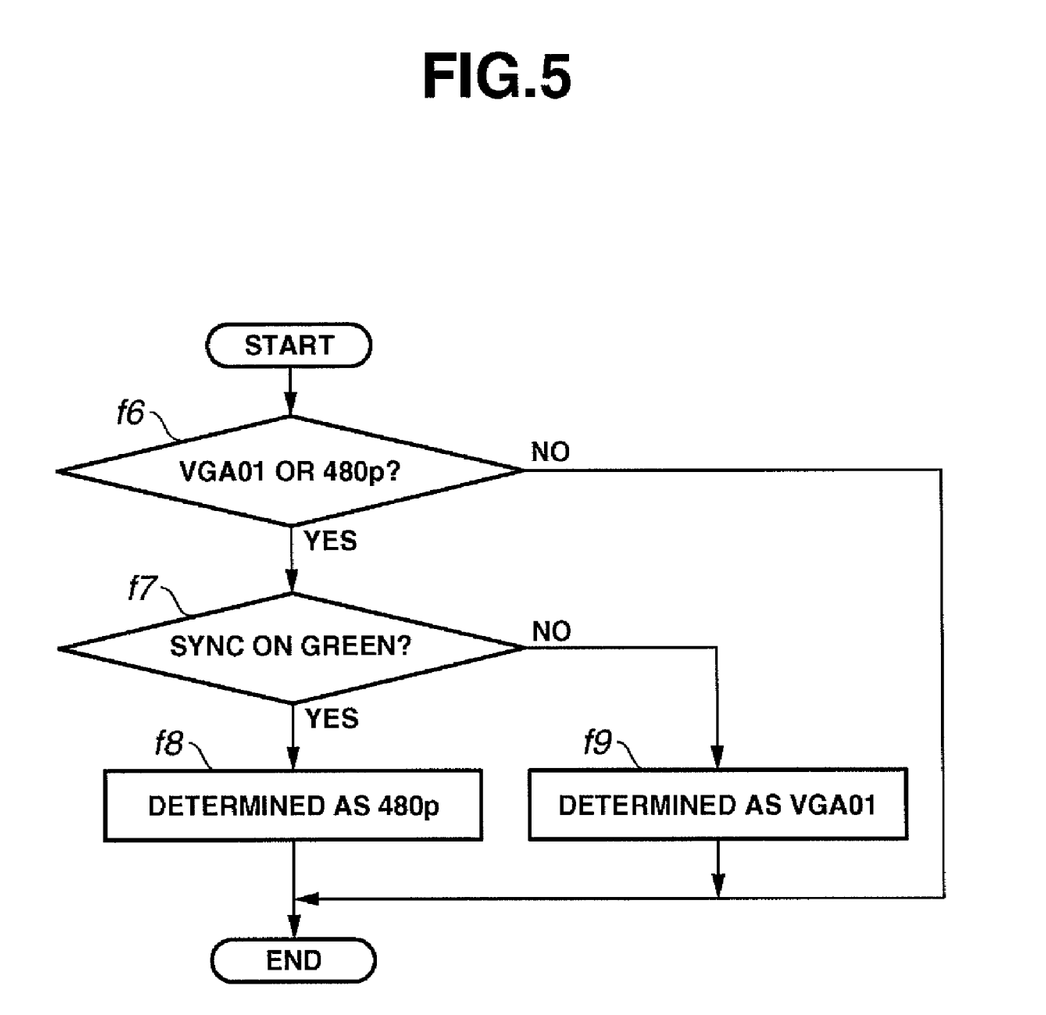
FIG. 5 is a flowchart illustrating an example method for identifying VGA01 and 480p signals according to the first exemplary embodiment.

FIG. 5 is a flowchart illustrating an example method for identifying VGA01 and 480p signals according to the first exemplary embodiment.

Now referring to FIG. 5, first, in step f6, the control section 1 determines based on horizontal and vertical frequencies whether an input signal is VGA01 or 480p. When the input signal is VGA01 or 480p (YES in step f6), the processing flow proceeds to step f7. In step f7, the control section 1 determines whether a synchronizing signal type sent from the synchronizing signal separating section 8 is sync on green. If the synchronizing signal type is sync on green (YES in step f7), the control section 1 determines that the input signal is 480p (refer to step f8).

If the input signal is 480p (NO in step f6), then the process ends. If the synchronizing signal type is not sync on green (NO in step f7), the control section 1 determines that the input signal is VGA01 (refer to step f9). Then the process ends.

As described above, the first exemplary embodiment can accurately discriminate whether an input signal is an analog RGB signal or a component video signal. Then, if an input signal is an analog RGB signal according to the discrimination result, the first exemplary embodiment can execute processing using a RGB color space.

If the input signal is a component video signal, the first exemplary embodiment can execute processing using a YPbPr or YCbCr color space. Thus, the first exemplary embodiment can realize an accurate display with a color space corresponding to an input signal.

The aforementioned first exemplary embodiment is dependent on a manual input selection. However, if the projection display apparatus of the present embodiment has an auto search function for automatically skipping a signal type if an input signal is absent, employing the first present exemplary embodiment can accurately discriminate an analog RGB and a component video signal from each other.

In the first exemplary embodiment, frequency measurement of input horizontal and vertical synchronizing signals is performed by the input signal processing section 11. However, the frequency measurement can be performed by the synchronizing signal separating section 8 or the AD converter 9 if a comparable measuring function is available. Additionally, instead of using a D-Sub 15 terminal, the first exemplary embodiment can use a DVI-I terminal or a 5BNC terminal to execute the above-mentioned processing.

Second Exemplary Embodiment

Figure 6:
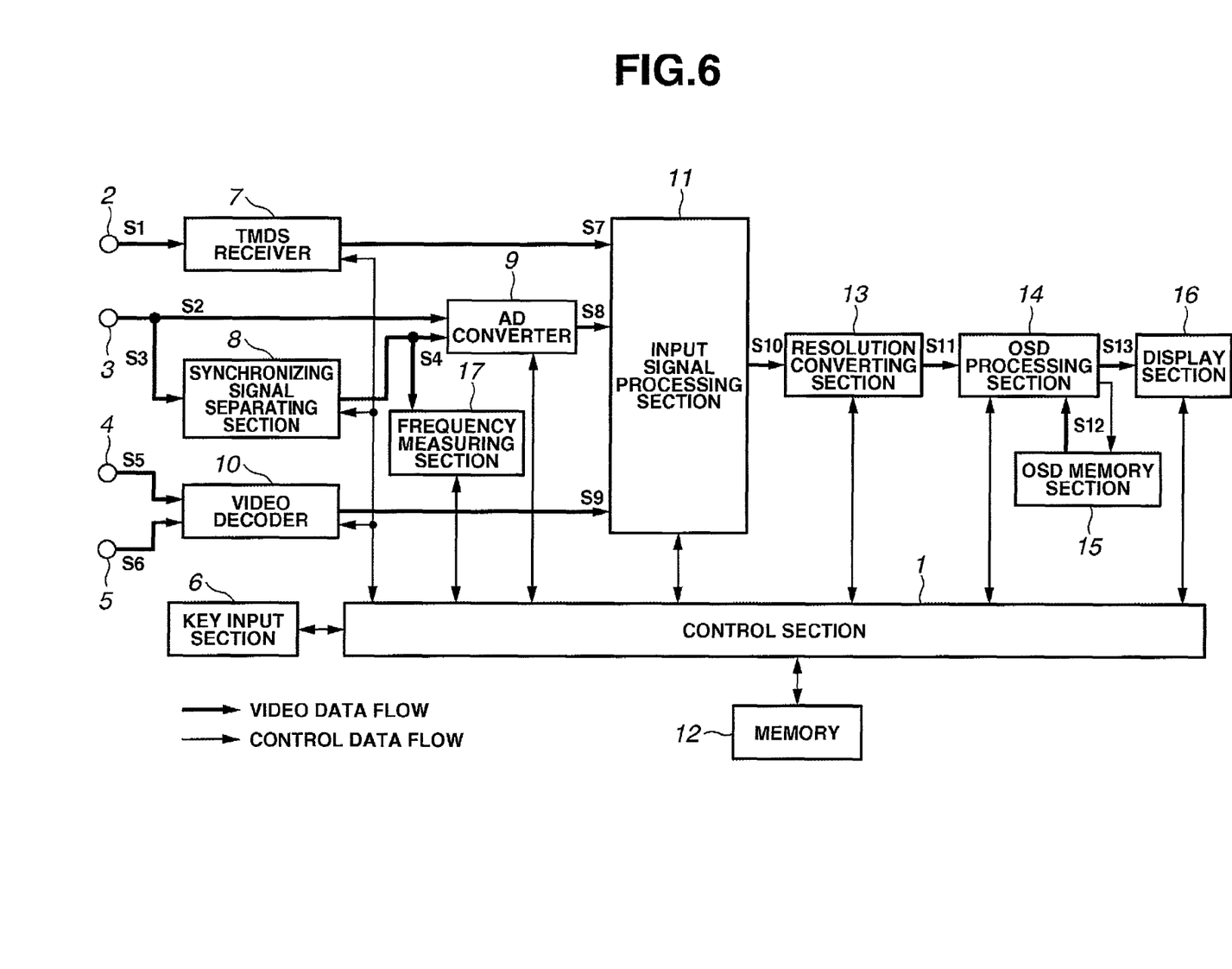
FIG. 6 is a block diagram illustrating an example projection display apparatus according to a second exemplary embodiment.

FIG. 6 is a block diagram illustrating a projection display apparatus according to a second exemplary embodiment. The projection display apparatus shown in FIG. 6 is different from the apparatus shown in FIG. 1 in that a frequency measuring section 17 is additionally provided to receive the output signal S4 from the synchronizing signal separating section 8.

If the synchronizing signal separating section 8 has a frequency measuring function, the frequency measuring section 17 can be omitted.

The TMDS receiver 7 can discriminate whether an effective TMDS signal is input from the DVI terminal 2. The video decoder 10 can discriminate, for each input line, whether an YC signal is input from the S video terminal 4 or whether a composite video signal is input from the composite video terminal 5. If the video decoder 10 does not have the aforementioned function, the synchronizing signal separating section 8 can use its input terminal to discriminate the presence of any video signal.

The frequency measuring section 17 measures frequencies of horizontal and vertical synchronizing signals produced from the synchronizing signal separating section 8. The frequency measuring section 17 sends the measured frequencies to the control section 1.

According to the first exemplary embodiment, the processing for detecting the presence of a synchronizing signal is performed only for a selected input. The second exemplary embodiment detects the presence of a synchronizing signal for both selected and non-selected inputs so as to improve the usability of input selecting section.

The projection display apparatus according to the second exemplary embodiment includes an input selecting section that can input: a digital RGB signal from the DVI terminal 2; an analog RGB signal from the D-Sub 15-pin terminal 3; a component video signal from the D-Sub 15-pin terminal 3; an S video signal from the S video terminal 4; and a composite video signal from the composite video terminal 5.

Figure 7:
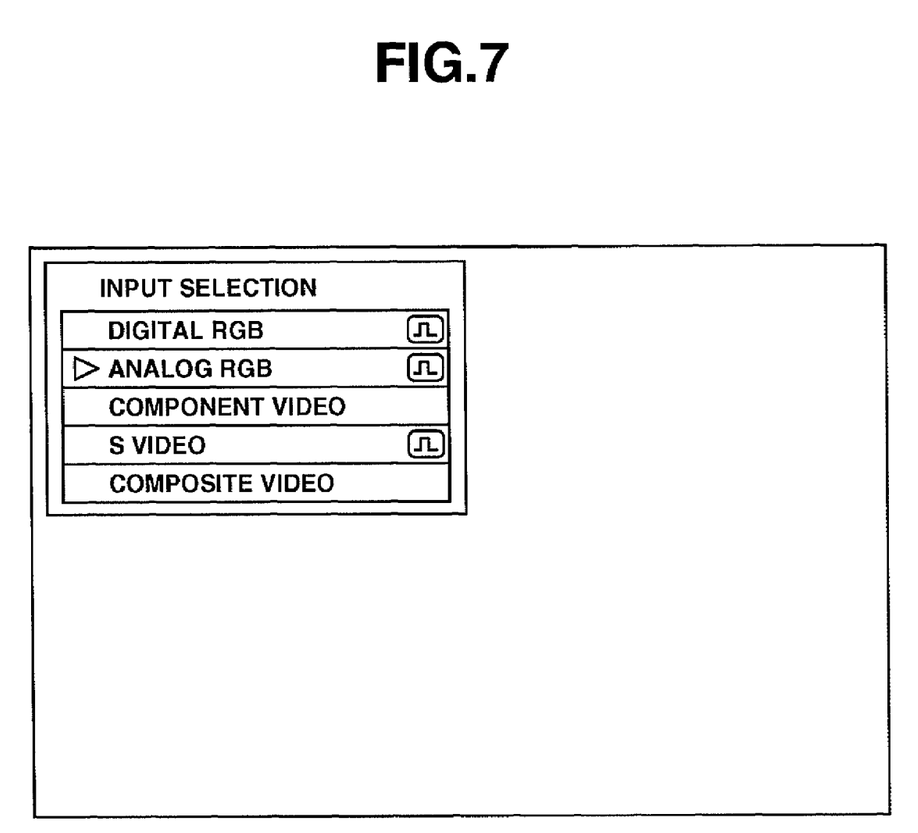
FIG. 7 illustrates an example input selection menu according to the second exemplary embodiment.

FIG. 7 illustrates an OSD input selection menu enabling a user to select the type of input signal. The input selection menu according to the second exemplary embodiment can display an icon at a predetermined position (right side) close to an input name if the synchronizing signal of an input is present.

If a user presses an input key in a condition that the OSD input selection menu is displayed, a focused position shifts to an input whose synchronizing signal is recognized and the input selection is switched.

According to a display example shown in FIG. 7 in which an analog RGB input is focused, an icon indicating the presence of a synchronizing signal is attached to each of digital RGB input, analog RGB input, and S video input. In this condition, a user can select other input, e.g., an S video input, by pressing the input key.

The projection display apparatus of the second exemplary embodiment can discriminate the presence of synchronizing signal in the following manner. The control section 1 can check a digital RGB input by monitoring, at intervals of several 100 msec, a function of the TMDS receiver 7 that can identify input of an effective TMDS signal. Since the D-Sub 15-pin terminal 3 is a common terminal inputting both an analog RGB input and a component input, the control section 1 determines the presence of a video signal according to a method shown in FIG. 8.

Figure 8:
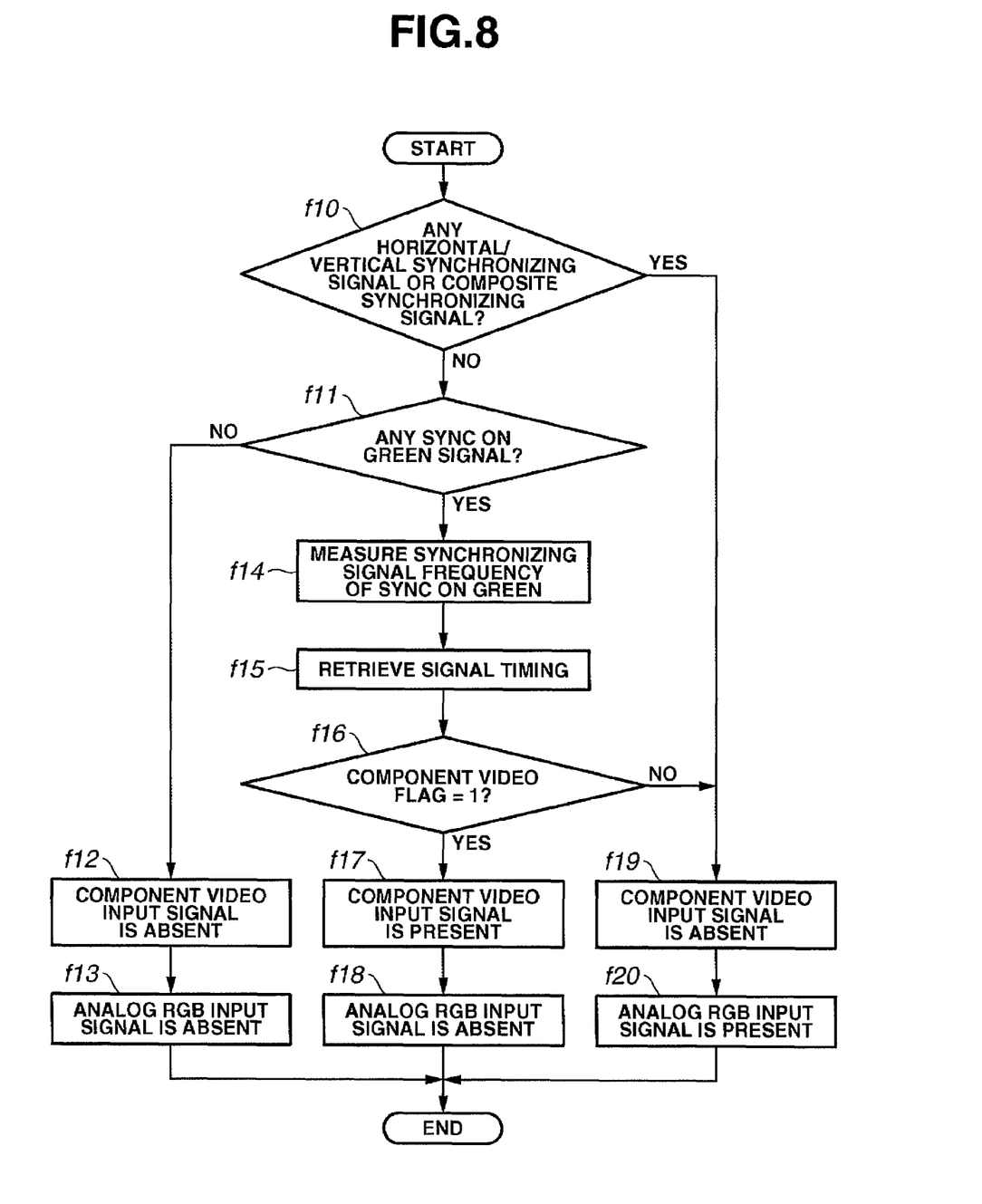
FIG. 8 is a flowchart illustrating an example input signal discrimination method according to the second exemplary embodiment.

First, the control section 1 receives a synchronizing signal type from the synchronizing signal separating section 8 and determines in step f10 whether a horizontal vertical synchronizing signal or a composite synchronizing signal is present. If any horizontal/vertical synchronizing signal or any composite synchronizing signal is present (YES in step f10), the control section 1 determines that the component video input signal is absent in step f19 and determines that the analog RGB input signal is present in step f20. Then the process ends.

If no horizontal vertical synchronizing signal is present and no composite synchronizing signal is present (NO in step f10), the control section 1 determines in step f11 whether any sync on green signal is present.

If a sync on green signal is present (YES in step f11), the control section 1 measures in step f14 a synchronizing signal frequency of the sync on green. Furthermore, in step f15, the control section 1 retrieves, from the signal timing table (refer to FIG. 3), signal timing having the closest synchronizing signal frequency. Then, in step f16, the control section 1 determines whether a component video flag of the selected timing data is 1.

If the component video flag of the selected timing data is 1 (YES in step f16), the control section 1 determines that the component video input signal is present in step f17 and determines that the analog RGB input signal is absent in step f18. Then the process ends. If the component video flag of the selected timing data is not 1 (NO in step f16), the control section 1 determines that the component video input signal is absent in step f19 and determines that the analog RGB signal input is present in step f20. Then the process ends.

If no sync on green signal is present (NO in step f11), the control section 1 determines that the component video input signal is absent in step f12 and determines that the analog RGB input signal is absent in step f13. The control section 1 can repeatedly update the discrimination result by executing the above-mentioned discrimination processing at intervals of several 100 msec. Then the process ends.

The control section 1 can check an S video input by monitoring, at intervals of several 100 msec, a function of the video decoder 10 that can identify input of YC signal. Similarly, the control section 1 can check an composite video input by monitoring, at intervals of several 100 msec, a function of the video decoder 10 that can identify input of composite video signal.

As described above, the second exemplary embodiment can accurately discriminate whether an input signal entered from a common terminal is an analog RGB signal or a component signal. The second exemplary embodiment can detect the presence of synchronizing signal regardless of user's manual input selection. The second exemplary embodiment enables a user to recognize each displayable input and easily switch the selection to a desirable input.

Furthermore, the second exemplary embodiment uses a D-Sub 15-pin terminal 3 for inputting an analog input. However, if the DVI terminal 2 is a DVI-I terminal receiving an analog input, the second exemplary embodiment can execute similar processing.

When the display apparatus uses only one synchronizing signal separating section 8, the synchronizing signal separating section 8 is required to have two series of horizontal and vertical synchronizing signal inputs and sync on green signal input. Furthermore two series of a synchronizing signal type discrimination unit and a frequency measurement unit are required for each of an input selected state and an input non-selected state.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-032689 filed Feb. 9, 2006, which is hereby incorporated by reference herein in its entirety.

What is claimed is:

1. A display apparatus comprising:
a common input terminal configured to input one of a couple types of input signals consisting of either an analog RGB signal or a component video signal;
a synchronizing signal separation unit configured to separate a synchronizing signal from the input signal entered from the common input terminal;
a frequency measurement unit configured to measure a frequency of the synchronizing signal; and
an input signal discrimination unit configured to discriminate the input signal entered from the common input terminal based on whether the synchronizing signal separated by the synchronizing signal separation unit is a sync on green signal or not and a measurement result obtained by the frequency measurement unit; and
an on screen display unit configured to display an input selection menu which displays a plurality of input signal types that may be selected by a user, wherein an analog RGB signal and component video signal selection option are coupled together and displayed as one of the plurality of input signal types that may be selected by the user.

2. The display apparatus according to claim 1, further comprising:
a memory configured to store synchronizing signal frequencies corresponding to standards of the analog RGB signal and the component video signal,
wherein the input signal discrimination unit discriminates that the input signal is the component video signal when the synchronizing signal separated by the synchronizing signal separation unit is a sync on green signal and the measurement result obtained by the frequency measurement unit represents the synchronizing signal stored in the memory that corresponds to the standard of the component video signal.

3. The display apparatus according to claim 1, further comprising a plurality of input terminals including the common input terminal, wherein the display apparatus periodically detects whether the input signal is input into each of plural input terminals.

4. The display apparatus according to claim 3, wherein the display apparatus shows a result of detecting whether the input signal is input into each of plural input terminals.

5. A method performed in a display apparatus for discriminating an input signal when a common input terminal is used to input one of a couple types of input signals consisting of either an analog RGB signal or a component video signal, the method comprising:
selecting an RGB signal and component video signal selection option displayed via an on screen display unit configured to display an input selection menu which displays a plurality of input signal types that may be selected by a user, wherein the analog RGB signal and component video signal option are coupled together and displayed as one of the plurality of input signal types that may be selected by the user;
receiving the input signal from the common input terminal;
via a separation signal unit, separating a synchronizing signal from the input signal;
via a frequency measurement unit, measuring a frequency of the synchronizing signal; and
via an input signal discrimination unit, discriminating the input signal based on whether the synchronizing signal is a sync on green signal or not and the frequency measurement result.

6. The method according to claim 5, wherein the display apparatus further includes a memory configured to store synchronizing signal frequencies corresponding to standards of the analog RGB signal and component video signal, the method further comprising:
discriminating that the input signal is the component video signal when the synchronizing signal is a sync on green signal and the frequency measurement result represents the synchronizing signal stored in the memory that corresponds to the standard of the component video signal.

7. A non-transitory computer readable medium containing computer-executable instructions performed in a display apparatus for discriminating an input signal when a common input terminal is used to input one of a couple types of input signals consisting of either an analog RGB signal or a component video signal, the computer readable medium comprising:
computer-executable instructions for displaying, via an on screen display unit, an input selection menu which displays a plurality of input signal types that may be selected by a user, wherein an analog RGB signal and component video signal option are coupled together and displayed as one of the plurality of input signal types that may be selected by the user; computer-executable instructions for receiving the input signal from the common input terminal;
computer-executable instructions for separating a synchronizing signal from the input signal via a separation signal unit;
computer-executable instructions for measuring a frequency of the synchronizing signal via a frequency measurement unit; and
computer-executable instructions for discriminating the input signal based on whether the synchronizing signal is a sync on green signal or not and the frequency measurement result via an input signal discrimination unit.

8. The medium according to claim 7, wherein the display apparatus further includes a memory configured to store synchronizing signal frequencies corresponding to standards of the analog RGB signal and component video signal, the medium further comprising:
computer-executable instructions for discriminating that the input signal is the component video signal when the synchronizing signal is a sync on green signal and the frequency measurement result represents the synchronizing signal stored in the memory that corresponds to the standard of the component video signal.

* * * * *